United States Patent [19]

Golombeck et al.

[11] 4,059,558

[45] Nov. 22, 1977

[54] WATER FREE LIGHT SILICA AND SILICATE FILLERS FOR CROSS-LINKING ELASTOMERS

[75] Inventors: Paul Golombeck, Bornheim-Widdig; Friedrich Hertl, Wesseling, both of Germany

[73] Assignee: Deutsche Gold- und Silber-Scheideanstalt vormals Roessler, Frankfurt, Germany

[21] Appl. No.: 652,058

[22] Filed: Jan. 26, 1976

Related U.S. Application Data

[62] Division of Ser. No. 493,886, Aug. 1, 1974.

[30] Foreign Application Priority Data

Aug. 27, 1973    Germany .......................... 2343160

[51] Int. Cl.$^2$ ............................ C08K 3/36; C08L 7/00
[52] U.S. Cl. ........................... 260/42.33; 260/42.32; 260/42.37; 260/765
[58] Field of Search ............... 260/42.33, 42.37, 42.32, 260/765

[56] References Cited

U.S. PATENT DOCUMENTS

| 3,859,247 | 1/1975 | Mackenzie | 260/42.33 |
| 3,867,326 | 2/1975 | Rivin et al. | 260/42.33 |
| 3,923,731 | 12/1975 | Mackenzie | 260/42.33 |

FOREIGN PATENT DOCUMENTS 2,004,443   8/1971   Germany

OTHER PUBLICATIONS

Kraus–Reinforcement of Elastomers (Interscience) (N.Y.) (1965), pp. 405–407 & 415–417.
Hofmann–Vulcanization & Vulcanizing Agents (Palmerton) (N.Y.), (1967), pp. 61–66.

Primary Examiner—Donald E. Czaja
Assistant Examiner—H. H. Fletcher
Attorney, Agent, or Firm—Cushman, Darby & Cushman

[57] ABSTRACT

Silica and silicates having a water content of less than 0.5% by weight and specific surface areas of 25 to 300 ($\pm$ 25) m$^2$/g. by the BET procedure are employed as light fillers for the vulcanization of natural rubber and synthetic elastomers with or without counter pressure.

15 Claims, No Drawings

WATER FREE LIGHT SILICA AND SILICATE FILLERS FOR CROSS-LINKING ELASTOMERS

This is a division of application Ser. No. 493,886 filed Aug. 1, 1974.

The invention concerns the use of water free, light silica and silicate fillers for the vulcanization (cross-linking) of natural rubber and synthetic elastomers with or without counter pressure.

For example, during the pressureless vulcanization (LCM, fluid bed and UHF) of elastomers using carbon black, the process can be carried out with only slight difficulties, but with the use of light reinforcing fillers one meets with considerable difficulties. The basis for this is the 5–7% water content of the fillers made in a wet process. In order to remove this disturbing water from the mixtures, various methods have been employed to remove the excess moisture or to bind it. The use of a vacuum extruder, the addition of water binding agents (mostly pasty CaO) as well as the use of hot mixing processes can be mentioned. Mixtures treated in this manner can undergo a considerable disturbance in the prevulcanization behavior, the vulcanization behavior and in the quality of the vulcanizate.

As previously mentioned, in spite of the use of a vacuum extruder or the addition of CaO it is not always possible, especially at higher filler dosages, to remove all water so that until now it has been quite difficult to cross-link without pressure, among others, extruded goods as occurs in the pressure free vulcanization. In elastomers filled with carbon black, this problem according to the production conditions either does not occur or only occurs slightly. However, now and especially in the near future special light extruded goods are of the greatest interests. The reason for this is not only in seeking the condition "light, colored or black extruded profiles" but in fashionable and psychological motives which refer to the friendly design of the surroundings.

These efforts are supported and required by the fact that now the existence of sufficiently light and ozone resistant elastomers permits the production of this type of vulcanizates. Therefore, new mixtures must be tried, whereby, for example, light APTK mixtures deserve special interest.

Today, there are added mostly inactive fillers which, however, do not result in a sufficiently smooth surface or especially in difficult shapes do not suffice for the requirements. There exists with this a general interest at the hand of the consumer industry for a light, active filler, which, although at a high dosage, produces pore free vulcanizates even in the pressureless vulcanization processes.

It has now been found that this can be accomplished by the use of water free, light fillers based on silica and silicates having a water content of not over 0.5 weight % and a specific surface area according to BET in the range of 25–300 ($\pm 25$) $M^2/g$ and vulcanizates can be produced even in pressureless vulcanization processes as well as in the presence of high content of filler.

Thus, the silica or silicate filler can be present in an amount of 5 to 500 parts per 100 parts of natural rubber or elastomer.

As silica, there can be used, for example Extrusil produced by De Gussa/Ffm/West-Germany.

By using active fillers which contain practically no water but in which their activity is the same or improved there can be relinquised the use of water-binding agents. Inactive, light fillers, practically free of water for the most part, are not sufficient for the reinforcement, especially of non-crystalline rubbers (SBR, NBR, EPDM). Through the use of the reinforcing fillers of low water content of the invention, it is possible to work in different elastomers in all filler ranges without the use of water binding agents.

The fillers of the invention can be used for example with natural rubber, synthetic rubbers, preferably diene elastomers as for example polybutadiene, polyisoprene, e.g., cis-polyisoprene, butadiene-styrene copolymer (SBR), butadiene-acrylonitrile copolymer (NBR), polymerized 2-chlorobutadiene, also butyl rubber, halogenated butyl rubber such as chlorinated butyl rubber, brominated butyl rubber as well as other known diene and higher polyene rubbers as for example terpolymers of ethylene, propylene and for example non-conjugated dienes and also non-conjugated higher polyenes (i.e., EPDM rubbers), e.g., terpolymers of ethylene-propylene-cyclooctadiene, ethylene-propylene-norbornadiene, ethylene-propylene dicyclo-pentadiene and ethylene-propylene-cyclododecatriene. Also there can be used trans-polypentenamer, carboxy or epoxy rubbers and the like known elastomers. The chemical derivatives of natural rubber and modified natural rubber can also be used in the invention.

Contrary to the assumption of professional people, it was surprisingly found that with this type of filler there is no change in either their good handling or in their activity compared to the previously known and used light, active, reinforcing fillers:

As examples of uses for the types of filler of the invention, there can be mentioned especially their use in injection molded articles such as windows, automobile and building profiles, with or without metal inserts. However, there are also producible in this manner other industrial articles such as tubing and transportation belts. Even the use in silica-filled-tires is not excluded.

The long known light, reinforcing fillers of the silica and silicate classes produced in the wet way are sufficiently dried under the influence of heat in a suitable manner that they are considered practically water free and can be used in rubber mixtures of all elastomers (natural or synthetic) in customary operable amounts without the use of water binding agents, which previously was not possible. The BET surface areas of these fillers ranges from 25–250 $m^2/g$, the DBA value from 50–250 mval/kg.+)

+) The abbreviation DBA value means n-Dibutylamine value which is expressed in mval/kg (= gramm equivalent/kg filler).

Furthermore there are suitable for the purpose of the invention finely divided highly active silicas produced through precipitation from alkali silicate solutions, e.g., sodium silicate solutions and potassium silicate solutions with acids, e.g., hydrochloric acid or sulfuric acid, which are extremely dried through a special heating process for the dried or predried and ground silica, in which this, for example, undergoes a temperature treatment of 700° to 1000° C. in a falling shaft in countercurrent to a dry inert gas, especially air, for a time of 1 to 10 seconds. The temperature is preferably 850° to 900° C. and the time preferably is less than 2 seconds. The production of this product is fully described in the Laufer German Offenlegungsschrift No. 2,004,443, the entire disclosure of which is hereby incorporated by reference.

A mixture produced with the fillers of the invention can contain any customary elastomer and in addition to the fillers of the invention only need the cross-linking system for pressureless vulcanization. These vulcanizing systems can be a sulfur containing, or peroxidic, e.g., t-butyl hydroperoxide, or other system (e.g., metal oxide or amine). In customary manner, the mixture can include plasticizers, activators, resins, pigments as well as antiagers and light stabilizers.

Unless otherwise indicated all parts and percentages are by weight.

The invention will be explained further in connection with the following examples, but is not limited to the fillers or cross-linking agents used in the examples.

As an example there are given below two mixtures one of which contains silica with the usual content of water and water binding agent while the other mixture (which is made according to the invention) has double the amount of water-free silica and does not contain the water binding agent. Both mixtures are vulcanizable without problem, i.e., without pore formation in the salt bath process and also in the UHF process.

EXAMPLE:

|  | MIXTURE (Parts by Weight) | |
|---|---|---|
|  | 1 | 2 |
| Ethylene-propylene-terpolymer rubber |  |  |
| EPDM Type 514 | 50.0 | 50.0 |
| EPDM Type 778 | 50.0 | 50.0 |
| Silica normal moisture about 6% BET surface area about 120 m$^2$/g | 40.0 | — |
| Water-free silica (0.5% water) BET surface area about 35 m$^2$/g | — | 80.0 |
| Dixie Clay (kaolin) | 120.0 | 120.0 |
| Plasticizer (Naphthenic) | 70.0 | 70.0 |
| Titanium Dioxide | 10.0 | 10.0 |
| zinc Oxide (active) | 5.0 | 5.0 |
| Water binding agent (CaO) | 8.0 | — |
| Triethanolamine | 3.0 | 3.0 |
| Ethylene Glycol | 3.0 | 3.0 |
| Vulkacit LDA* | 2.0 | 2.0 |
| Vulkacit Mercapto (mercaptobenzothiazole) | 0.75 | 0.75 |
| Vulkacit Thiuram** | 0.75 | 0.75 |
| Sulfur | 1.5 | 1.5 |
| Vulcanization | 30 min/150° C. | 30 min/150° C. |
| Strength, kg/cm$^2$ | 110.0 | 87.0 |
| Hardness | 61 | 70 |
| 300% modulus kg/cm$^2$ | 22 | 40 |
| Elongation at break % | 710 | 595 |

*diethyl dithiocarbamic acid zinc salt
**tetramethylthiuram disulfide

Both vulcanizates were free of pores and there were no problems using either the LCM-bath or UHF mode of vulcanization.

What is claimed is:

1. A process comprising vulcanizing without the use of pressure a composition consisting essentially of (1) a vulcanizable elastomer, (2) a vulcanizing agent, and (3) a light filler selected from the group consisting of silica and silicates having a water content of not over 0.5% by weight and having a BET specific surface area of 25 to 300 m$^2$/g, said silica or silicate having been prepared by wet precipitation followed by drying until practically water free.

2. A process according to claim 1 wherein said filler is silica.

3. A process according to claim 1 wherein the elastomer is selected from the group consisting of natural rubber, butadiene-styrene copolymer, butadiene-acrylonitrile rubber and ethylene-propylene-terpolymer rubber.

4. A process according to claim 3 where the filler is silica.

5. A process according to claim 1 wherein the silica or silicate is present in an amount of 5 to 500 parts per 100 parts by weight of the elastomer.

6. A process according to claim 5 wherein the filler is silica.

7. A process according to claim 5 wherein the elastomer is selected from the group consisting of natural rubber, butadiene-styrene copolymer, butadiene-acrylonitrile copolymer and ethylene-propylene-terpolymer rubber.

8. A process according to claim 7 wherein the filler is silica.

9. a process according to claim 8 wherein the rubber is ethylene-propylene-terpolymer rubber.

10. A process according to claim 5 wherein said silica or silicate has been prepared by the wet precipitation of an alkali silicate solution with an acid.

11. A process according to claim 5 wherein the silica or silicate has been prepared by the wet precipitation of an alkali silicate with an acid followed by drying at 700° to 1000° C. in an inert gas for 1 to 10 seconds.

12. A process according to claim 1 wherein the vulcanizing agent is a sulfur containing vulcanizing agent.

13. A process according to claim 12 wherein the elastomer is selected from the group consisting of natural rubber, butadiene-styrene copolymer, butadiene-acrylonitrile copolymer and ethylene-propylene-terpolymer.

14. A process according to claim 5 wherein the filler is silica having a BET specific surface area of about 35 m$^2$/g.

15. a process according to claim 14 wherein the filler is present in an amount of 80 parts per 100 parts of elastomer and the elastomer is selected from the group consisting of natural rubber, butadiene-styrene copolymer, butadiene-acrylonitrile copolymer and ethylene-propylene-terpolymer rubber.

* * * * *